United States Patent
Li et al.

(10) Patent No.: US 10,747,766 B2
(45) Date of Patent: Aug. 18, 2020

(54) CONTEXT BASED ACCESS PATH SELECTION

(71) Applicant: International Business Machines Corporation, Armonk, NY (US)

(72) Inventors: Shuo Li, Beijing (CN); Ke Wei Wei, Beijing (CN); Li Yang, Beijing (CN); Xin Ying Yang, Beijing (CN); Jian Wei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 15/977,601

(22) Filed: May 11, 2018

(65) Prior Publication Data

US 2018/0260441 A1   Sep. 13, 2018

Related U.S. Application Data

(63) Continuation of application No. 15/345,168, filed on Nov. 7, 2016, now Pat. No. 10,019,482, which is a continuation of application No. 14/854,087, filed on Sep. 15, 2015, now Pat. No. 10,013,457.

(51) Int. Cl.
   *G06F 16/2453*   (2019.01)
   *G06F 16/2455*   (2019.01)

(52) U.S. Cl.
   CPC .. *G06F 16/24545* (2019.01); *G06F 16/24549* (2019.01); *G06F 16/24568* (2019.01)

(58) Field of Classification Search
   CPC ............................................. G06F 16/24545
   See application file for complete search history.

(56) References Cited

U.S. PATENT DOCUMENTS

| | | | |
|---|---|---|---|
| 5,940,819 A | 8/1999 | Beavin et al. |
| 6,006,220 A | 12/1999 | Haderle et al. |
| 7,275,051 B2 | 9/2007 | Hrle |
| 7,941,425 B2 | 5/2011 | Sahu et al. |
| 2006/0095406 A1 | 5/2006 | Bestgen et al. |
| 2007/0162426 A1 | 7/2007 | Brown et al. |
| 2013/0018890 A1 | 1/2013 | Rajan et al. |
| 2013/0086038 A1 | 4/2013 | Perry |

(Continued)

OTHER PUBLICATIONS

Li et al., "Context Based Access Path Selection", U.S. Appl. No. 14/854,087, filed Sep. 15, 2015.

(Continued)

*Primary Examiner* — Kris E Mackes
(74) *Attorney, Agent, or Firm* — Daniel R. Simek

(57) ABSTRACT

A computer-implemented method includes receiving a batch processing job. The method identifies multiple access paths for the batch processing job. The method determines one or more runtime costs for each of the multiple access paths. The method determines whether the batch processing job includes comparable access paths. The method responds to the batch processing job not including comparable access paths by receiving a query and selecting a desired access, based on the one or more runtime costs. The method responds to the batch processing job including comparable access paths by determining one or more context costs for each of the one or more access paths, receiving a query, identifying a context for the query, and selecting a desired access path for the query. The desired access path is based on the one or more runtime costs, the one or more context costs, and the context for the query.

17 Claims, 4 Drawing Sheets

(56) References Cited

U.S. PATENT DOCUMENTS

2013/0159321 A1    6/2013    Bossman et al.
2014/0310261 A1    10/2014    Nagpal et al.

OTHER PUBLICATIONS

Li et al., "Context Based Access Path Selection", U.S. Appl. No. 15/345,168, filed Nov. 7, 2016.

List of IBM Patents or Patent Applications Treated as Related, filed herewith, 2 pages.

CONTEXT BASED ACCESS PATH SELECTION

BACKGROUND

The present invention relates generally to batch processes and in particular to selecting access paths.

Batch processing is the execution of a series of programs on a computer without manual intervention. Structured Query Language (SQL) is a programming language for stream-processing in batch processes. SQL is subdivided into several language elements, including clauses, expressions, predicates, queries, and statements. A database management system (DBMS) retrieves data based on criteria specified in a query. The DBMS retrieves data for the query via an access path for the batch processing job. Some batch processing jobs include multiple possible access paths that a DBMS might use to retrieve data. The DBMS may choose a particular access path based on the predicted runtime cost for each possible access path, favoring the fastest of the multiple access paths. Developers continue to face challenges with functions, methods, and systems for selecting the query access path.

SUMMARY

A computer-implemented method includes receiving a batch processing job. The method identifies one or more access paths for the batch processing job. The method determines one or more runtime costs. Each runtime cost is for each of the one or more access paths. The method determines whether the batch processing job includes comparable access paths. The method responds to the batch processing job not including comparable access paths. The method responds by receiving a query. The method responds by selecting a desired access path for the query. The desired access path for the query is based on the one or more runtime costs. The method responds to the batch processing job including comparable access paths. The method responds by determining one or more context costs. Each of said one or more context costs is a context cost for each of the one or more access paths. The method responds by receiving a query. The method responds by identifying a context for the query. The method responds by selecting a desired access path for the query. The desired access path for the query is based on the one or more runtime costs, the one or more context costs, and the context for the query. A corresponding computer system and computer program product are also disclosed.

DETAILED DESCRIPTION

Figure 1:
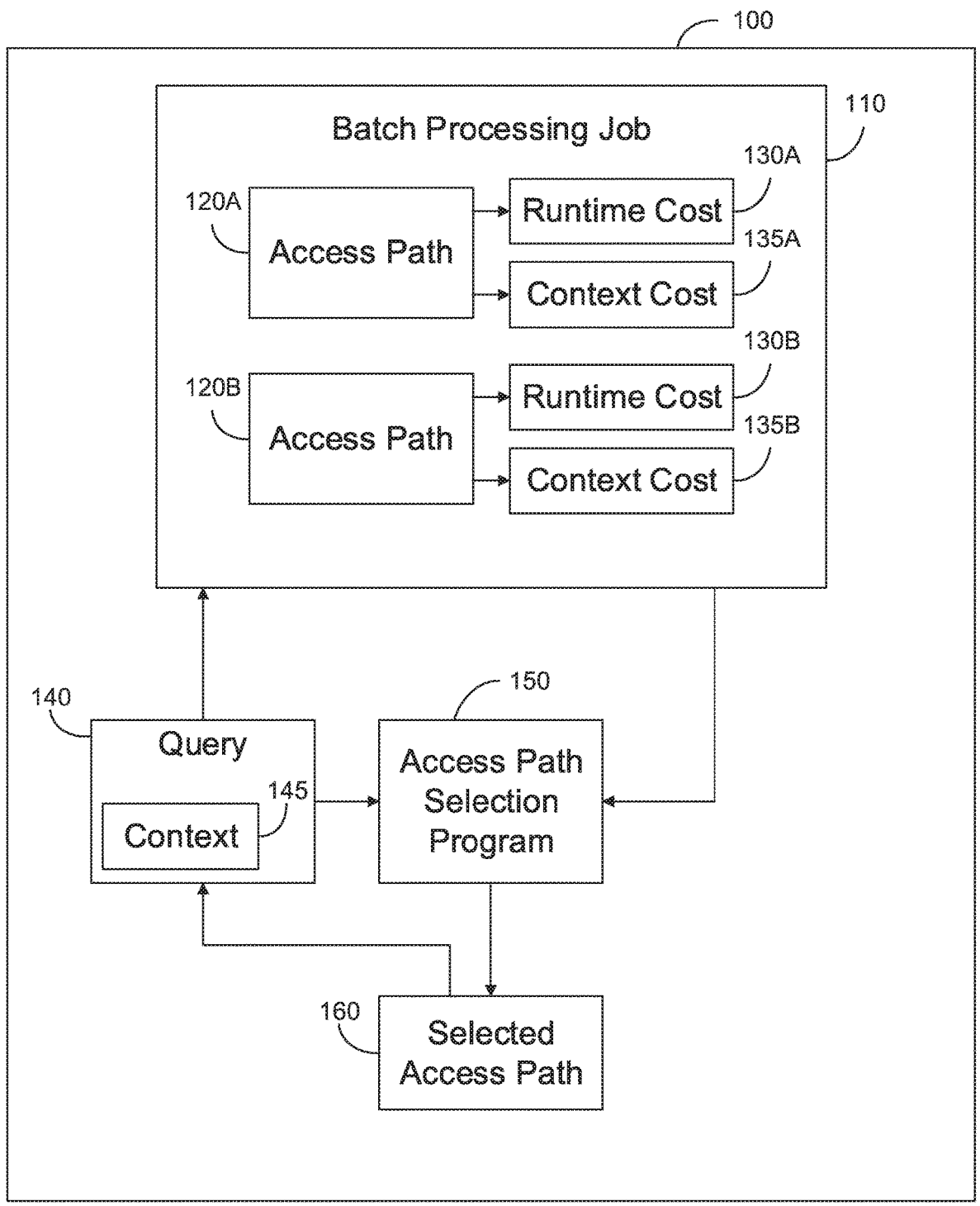
FIG. 1 is a block diagram of one embodiment of a computer system environment suitable for operation in accordance with at least one embodiment of the invention.

Referring now to the invention in more detail, FIG. 1 is a block diagram displaying an exemplary computer system environment suitable for operation of at least one embodiment of the invention. A computer system 100 includes a batch processing job 110, an access paths 120A and 120B, a runtime costs 130A and 130B, a context costs 135A and 135B, a query 140, a context 145, an access path selection program 150, and a selected access path 160, all in mutual electronic communication and interconnected within the computer system 100.

The access path selection program 150 may generate the selected access path 160 for use by the query 140 during the batch processing job 110. The batch processing job 110 includes one or more access paths such as the access paths 120A and 120B. The access paths 120A and 120B are available to the query 140 as steps for the query 140 to perform to retrieve data. Each of the one or more access paths comprises a runtime cost such as the runtime costs 130A and 130B. Each of the one or more access paths comprises a context cost such as the context costs 135A and 135B.

The batch processing job 110 is a series of programs, tasks, or jobs performed by the computer system 100. The series of programs, tasks, or jobs are programmed such that the computer system 100 can execute the batch processing job 110 to completion without human interaction. The series of programs, tasks, or jobs may be expressed in Structured Query Language (SQL). SQL includes clauses, expressions, predicates, queries, such as the query 140, and statements which enable the computer system 100 to execute the batch processing job 110 to completion.

The query 140 is an element of SQL used by the computer system 100 to execute the batch processing job 110. The query 140 is used to retrieve data. The query 140 retrieves data from one or more tables, one or more expressions, one or more indexes, or one or more databases. The query 140 may retrieve data from different locations or combinations of locations. Such differences result in the batch processing job 110 comprising one or more access paths by which the query 140 may retrieve data. The query 140 comprises the context 145.

The context 145 is a set of data used by the computer system 100 to execute the query 140. The context 145 comprises a set of metadata associated with the set of data used by the computer system 100 to execute the query 140. For example, the context 145 would comprise data indicating whether the query 140 is executed in a batch loop. In some embodiments, the context 145 is based on an input data sequence for the query 140 and comprises an identified order. For example, a query may prompt the computer system 100 to select a set of values from a table A where a first column of the table A meets a first criteria and a second column of the table A meets a second criteria. In such an example, the input data sequence comprises the identified order (first column of table A, second column of table A). In such an example, the context 145 would comprise data indicating whether the query 140 is executed in a batch loop. In embodiments where the query 140 is executed in a batch loop, the batch processing job may include two candidate access paths for the query 140. A first candidate access path follows the identified order (first column of table A, second column of table A). A second candidate access path follows an order (second column of table A, first column of table A).

The access paths 120A and 120B are actions by which the computer system 100 retrieves data from one or more tables, one or more expressions, one or more indexes, or one or more databases. For example, the access paths 120A and 120B may be full table scans, row ID scans, index scans, cluster access scans, or hash access scans. In general the access paths 120A and 120B are steps the computer system 100 may take to execute the query 140 as a part of the batch processing job 110.

Each of the access paths 120A and 120B correspond to the runtime costs 130A and 130B, respectively. The access path selection program 150 determines the runtime costs 130A and 130B. In general, the runtime costs 130A and 130B are an execution time. The runtime costs 130A and 130B are an amount of resources, such as time and storage, necessary to execute the query 140. In some embodiments, the access path selection program 150 determines the runtime costs 130A and 130B as a function relating a query 140 input length to a number of steps executed by the query 140 and a data storage location for the data the query 140 prompts the computer system 100 to retrieve. In some embodiments, the access path selection program 150 determines the runtime costs 130A and 130B using a uniform cost model or a logarithmic cost model.

Each of the access paths 120A and 120B correspond to the context costs 135A and 135B, respectively. The access path selection program 150 determines the context costs 135A and 135B. In general, the context costs 135A and 135B consider how the context 145 may affect the execution time of the query 140. In examples where the query 140 is executed in a batch loop, the access path selection program 150 considers that the computer system 100 may execute multiple passes of the query 140 as a part of the number of steps executed by the query 140. In such embodiments, the access path selection program 150 may determine the context costs 135A and 135B as a function by relating a query 140 input length, a number of steps executed by the query 140, and a data storage location for the data the query 140 prompts the computer system 100 to retrieve. In such embodiments, the number of steps, the data storage location, and the query 140 input length include the iteration steps the computer system 100 takes when executing the query 140 in a batch loop. In some embodiments, the access path selection program 150 determines the context costs 135A and 135B using a uniform cost model or a logarithmic cost model. Each of the access paths 120A and 120B may have additional corresponding context costs (not shown). For example, an access path may have a first context cost corresponding to the context 145 including that the query 140 is a single query and a second context cost corresponding to the context 145 including that the query 140 is executed in a batch job loop.

The selected access path 160 is one of the access paths 120A and 120B. The access path selection program 150 selects the selected access path 160 between the access paths 120A and 120B by comparing the runtime costs 130A and 130B and relevant context costs for each of the access paths 120A and 120B, the relevant context costs for each of the access paths 120A and 120B corresponding to the context 145. The runtime costs 130A and 130B and the context costs 135A and 135B are lengths of time. The selected access path 160 corresponds to an access path associated with the shortest length of time. For example, if among runtime costs A and B and context costs C and D, runtime cost A is the shortest length of time, the access path associated with runtime cost A will be the selected access path 160.

Figure 2:
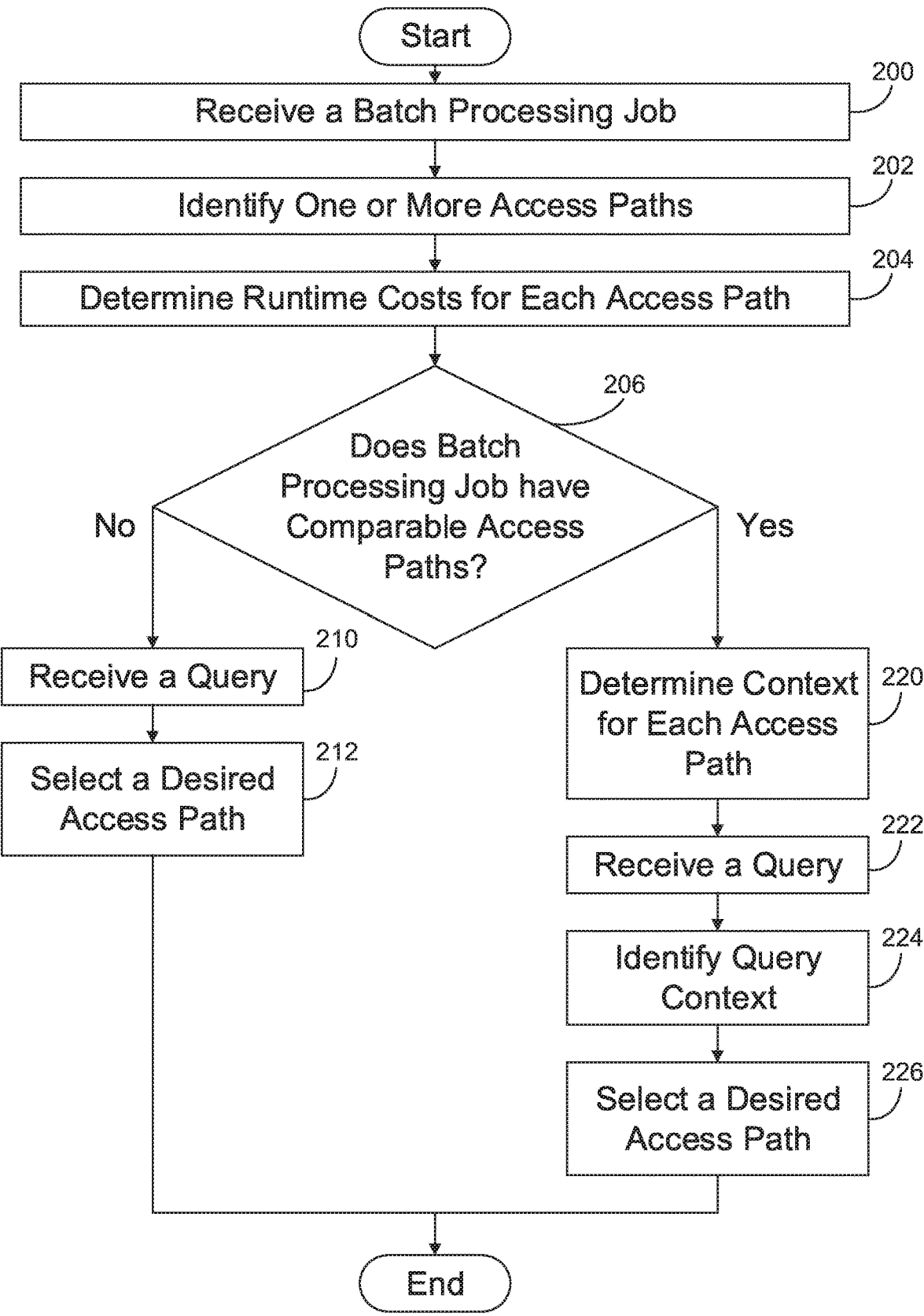
FIG. 2 is a flowchart depicting operational steps for an access path selection program in accordance with at least one embodiment of the invention.

FIG. 2 is a flowchart depicting the operational steps of the access path selection program 150 executing within the computer system of FIG. 1, in accordance with an embodiment of the present invention.

At step 200, the access path selection program 150 receives the batch processing job 110. Receiving may include a user explicitly calling the access path selection program 150 from a command line interface using a reference to the selected access path 160 as an argument. Alternatively, receiving may include automated calls to the access path selection program 150, for example from an integrated development environment or as part of a batch process management system.

At step 202, the access path selection program 150 identifies one or more access paths, such as the access paths 120A and 120B, which are available during the batch processing job 110, for each query for the batch processing job 110. The access path selection program 150 performs the step 202 by identifying one or more access paths. Selecting may include a segment scan or an index scan. Selecting may include metadata about a database the batch processing job 110 is referencing such as metadata about tables, rows, and columns within the database and indexes associated with data within the database.

At step 204, the access path selection program 150 determines runtime costs, such as the runtime costs 130A and 130B, for each query. The access path selection program 150 performs the step 204 by determining one or more runtime costs. The access path selection program 150 acts to determine one or more runtime costs. The access path selection program 150 determines a runtime cost for each of the one or more access paths identified at the step 202. Determining runtime costs may include a function relating the query input length to a number of steps within the query and a data storage location for the data the query prompts the computer system 100 to retrieve. In some embodiments, the access path selection program 150 determines the runtime costs 130A and 130B using a uniform cost model or a logarithmic cost model.

At step 206, the access path selection program 150 determines if the batch processing job 110 contains comparable runtime costs. The access path selection program 150 compares each runtime cost determined at the step 204 for each query. Each runtime cost, such as the runtime costs 130A and 130B, and the runtime costs determined at the step 204 is a length of time. The access path selection program 150 compares the runtime costs determined at the step 204 by comparing the length of time that is each runtime cost. The access path selection program 150 determines if the batch processing job 110 contains comparable runtime costs based on a predetermined criterion.

For example, in some embodiments, the access path selection program 150 will determine if the batch processing job 110 contains comparable runtime costs by determining whether said batch processing job includes one or more candidate query contexts. Determining may involve counting the number of query contexts to determine if the batch processing job 110 includes one or more candidate query contexts. For example, a batch processing job A contains query A. Query A can only be executed in a batch loop in the batch processing job A. In such an example, the access path selection program 150 will determine the batch processing job 110 does not contain comparable runtime costs with respect to Query A. The access path selection program 150 may count the number of candidate query contexts associated with Query A. In such an example, the access path selection program 150 will determine that Query A has only one candidate query context. The access path selection program 150 may count one or more candidate query contexts. The access path selection program 150 counts only one candidate query contexts, determine the batch processing job 110 does not contain comparable runtime costs. The access path selection program 150 may count two or more candidate query contexts, determine the batch processing job 110 does contain comparable runtime costs.

In another example the batch processing job A contains a Query B. Query B can be executed as a single query or executed in a batch loop context. In such an example Query B may be executed in a for loop where under certain conditions the Query B is executed in a single query context and under other conditions the Query B is executed in a batch loop context. In such an example, the access path selection program 150 determines that the batch processing job 110 contains two or more candidate query costs and is responsive by determining that the batch processing job 110 contains comparable runtime costs. In such an embodiment, the access path selection program 150 may also identify two or more comparable access paths.

In another example the access path selection program 150 determines if the batch processing job 110 contains comparable access paths by counting the number of access paths for the batch processing job 110. This is done by counting one or more candidate query contexts or counting two or more candidate query contexts. In such an embodiment, the access path selection program 150 determines if the batch processing job 110 contains only one access path or if the batch processing job 110 contains two or more access paths. If the access path selection program 150 determines that the batch processing job contains only one access path, the access path selection program 150 will complete the step 206 by determining that the batch processing job 110 does not contain comparable access paths. The access path selection program 150 may count only one access path, determine the batch processing job 110 does not contain comparable access paths. The access path selection program 150 may count two or more access paths, determine the batch processing job 110 does contain comparable access paths. If the access path selection program 150 determines that the batch processing job contains two or more access paths, the access path selection program 150 will complete the step 206 by determining that the batch processing job 110 does contain comparable access paths. In some embodiments, the access path selection program 150 may determine if the batch processing job 110 contains comparable access paths by counting the number of access paths associated with each query associated with the batch processing job 110.

In embodiments where the access path selection program 150 determines that the batch processing job 110 does not contain comparable access paths, the access path selection program 150 proceeds to step 210. At the step 210 the access path selection program 150 receives the query 140. In some embodiments, the access path selection program 150 receives the query 140 during an execution time for the batch processing job 110.

At step 212, the access path selection program 150 selects an access path for the query 140 based on the runtime costs determined at the step 204. The access path selected for the query 140 is the selected access path 160. In some embodiments, the access path selection program 150 chooses the selected access path 160 based on execution time, with the selected access path 160 having the shortest execution time compared to other candidate access paths. In other embodiments, the selected access path 160 may be an only candidate access path for the query 140. In other embodiments, the access path selection program 150 may choose the selected access path 160 based on a number of steps, with the select access path 160 having the fewest number of steps when compared to other candidate access paths.

In embodiments where the access path selection program 150 determines that the batch processing job 110 does contain comparable access paths, the access path selection program 150 proceeds to step 220. At the step 220 the access path selection program 150 determines a context cost for each comparable access path identified at the step 206. The access path selection program 150 determines if any access paths for a query have a comparable cost to determine one or more context costs.

At step 222 the access path selection program 150 receives the query 140. In some embodiments, the access path selection program 150 receives the query 140 during an execution time for the batch processing job 110.

At step 224 the access path selection program 150 identifies the context 145. Identifying may include analyzing the SQL associated with the query 140 to determine the context of the query 140. For example, the access path selection program 150 may analyze the SQL of a query and determine the query 140 is executed in a batch loop. In such an example, the access path selection program 150 will determine that the context 145 for the query 140 is that a batch loop context.

At step 226 the access path selection program 150 will select the selected access path 160. The access path selection program 150 may select the selected access path 160 by choosing between the two or more comparable access paths that were identified during the step 206. In some embodiments, the access path selection program 150 will choose between the two or more comparable access paths by selecting an access path that is one of the two or more comparable access paths based on which has a lower context cost, given the context 145 of the query 140. For example, a Query C has three possible access paths: access path X, access path Y, and access path Z. Access path X and access path Z are comparable. Access path Z has a lower single query context cost. Access path X has a lower batch loop context cost. In such an example, if the access path selection program 150 determines that the Query C has a batch loop context, Access path X will be the selected access path 160. If the access path selection program 150 determines that the Query C has a single query context, Access path Z will be the selected access path 160.

In some embodiments, the access path selection program 150 determines, at bind time, a query dependency structure and selects, at execution time, the selected access path 160. The query dependency structure is a desired access path for each query in a given context. At bind time, the access path selection program 150 may determine runtime costs and context costs for each query. At execution time, the access path selection program 150 may select the selected access path 160 based on the query dependency structure determined at execution time.

Figure 3:
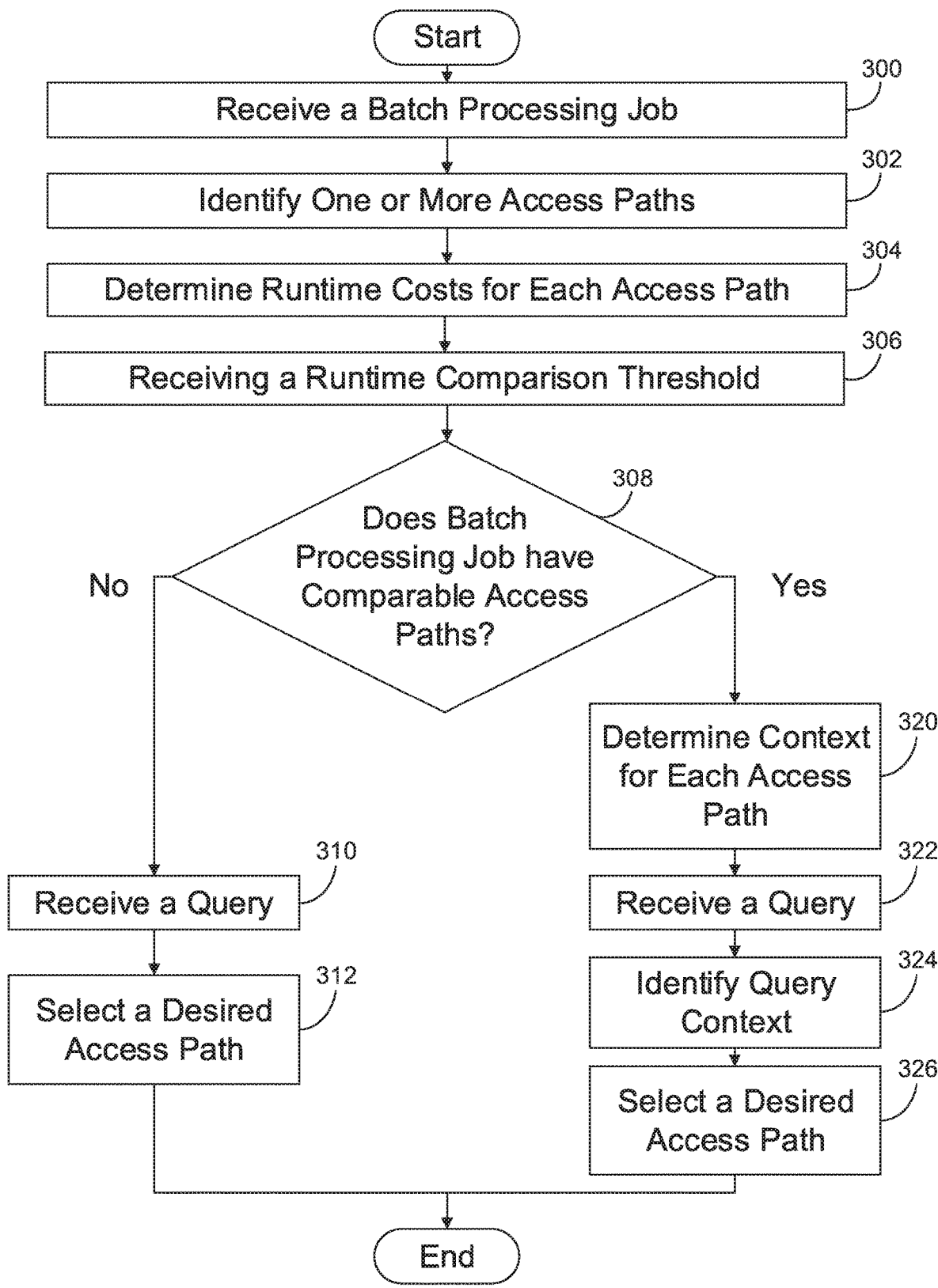
FIG. 3 is a flowchart depicting operational steps for an access path selection program that determines if a batch processing job has comparable access paths based on a runtime comparison threshold in accordance with at least one embodiment of the invention.

FIG. 3 is a flowchart depicting the operational steps of the access path selection program 150 executing with the computer system of FIG. 1, in accordance with an embodiment of the present invention where the access path selection program 150 determines if the batch processing job 110 includes comparable access paths is based on a runtime comparison threshold.

The access path selection program 150 performs step 300, step 302, and step 304 in a way that is similar to the embodiment depicted in FIG. 2.

At step 306 the access path selection program 150 receives a runtime comparison threshold. The runtime comparison threshold is a pre-determined value that corresponds to a numerical difference in execution time amongst various runtime costs that were determined at the step 304. In some embodiments the runtime comparison threshold is a difference in time or a numerical difference in runtime. In other embodiments the runtime comparison threshold is a measure of resource required by the computer system 100 to use an access path.

At step 308 the access path selection program 150 determines if the batch processing job has comparable access paths or if no such access paths exist. The access path selection program 150 uses the runtime comparison threshold to make this comparison. For example, the runtime comparison threshold may be thirty seconds. A batch processing job contains access paths G and access path H for a Query E. A runtime cost for the access path G may be forty-five seconds. A runtime cost for the access path H may be one minute. In such an embodiment, the access path selection program 150 will determine that the difference between access path G and access path H is below the runtime comparison threshold and determine that the batch processing job does have comparable access paths for the Query E.

The access path selection program 150 performs step 310, step 312, step 320, step 322, step 324, and step 326 in a way that is similar to the embodiment depicted in FIG. 2.

Figure 4:
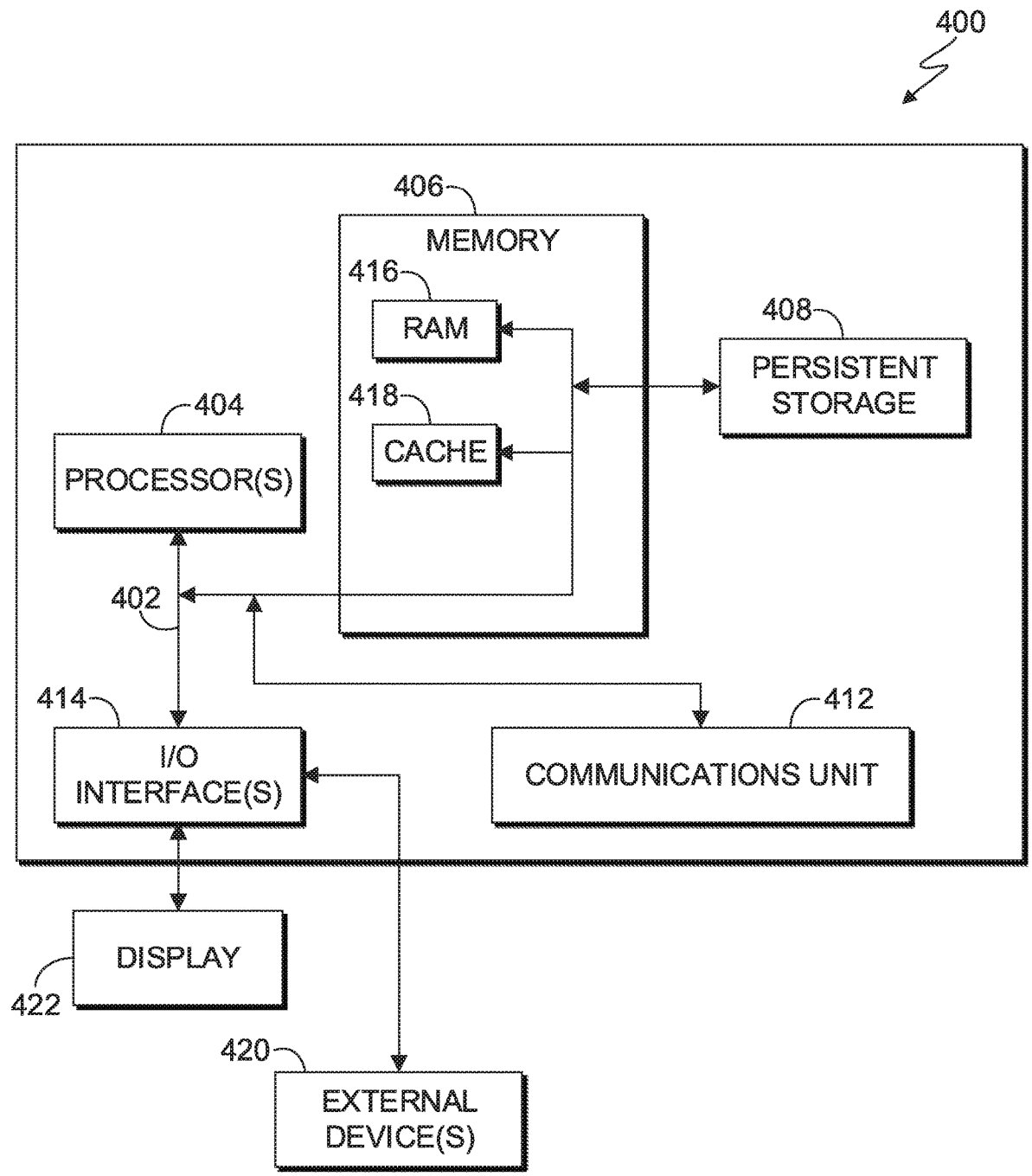
FIG. 4 is a block diagram of a computing apparatus suitable for executing the access path selection program in accordance with at least one embodiment of the present invention.

FIG. 4 is a block diagram depicting components of a computer 400 suitable for executing the access path selection program 150. FIG. 4 displays the computer 400, the one or more computer processor(s) 404 (including one or more computer processors), the communications fabric 402, the memory 406, the RAM 416, the cache 418, the persistent storage 408, the communications unit 410, the I/O interface(s) 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 418, the computer processor(s) 404, the memory 406, the persistent storage 408, the communications unit 410, and the input/output (I/O) interface(s) 412. The communications fabric 402 may be implemented with any architecture suitable for passing data and/or control information between the computer processor(s) 404 (e.g. microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 418 is a fast memory that enhances the performance of computer processor(s) 404 by holding recently accessed data, and data near accessed data, from memory 406.

Program instructions for the access path selection program 150 may be stored in the persistent storage 408 or in memory 406, or more generally, any computer readable storage media, for execution by one or more of the respective computer processor(s) 404 via the cache 418. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The access path selection program 150 may be downloaded to the persistent storage 408 through the communications unit 410. In some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface(s) 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In some embodiments, the access path selection program 150 is any program, list, database, or any other system capable of receiving the batch processing job 110 and the query 140. The access path selection program 150 may be a dedicated client DBMS program, a function integrated within another program, or any program or function that can communicate with the batch processing job 110 and the query 140, and provide the selected access path 160.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a batch processing job;
   identifying one or more access paths for said batch processing job;
   determining one or more runtime costs, each runtime cost being for each of said one or more access paths;
   determining whether said batch processing job comprises comparable access paths, wherein determining whether said batch processing job comprises comparable access paths comprises:
      receiving a runtime comparison threshold, said runtime comparison threshold being a numerical difference in runtime between each runtime cost of said one or more runtime costs;

determining whether any said runtime cost comprises a comparable cost, said comparable cost being based on said runtime comparison threshold; and responsive to any said runtime cost comprising said comparable cost;

determining that said batch processing job does comprise comparable access paths; and responsive to no said runtime cost comprising said comparable cost;

determining that said batch processing job does not comprise comparable access paths; and responsive to said batch processing job not comprising comparable access paths:

receiving a query;

selecting a first desired access path for said query, said first desired access path for said query being based on said one or more runtime costs; and responsive to said batch processing job comprising comparable access paths:

determining one or more context costs, each of said one or more context costs being a context cost for each of the one or more access paths; and receiving a query;

identifying, for said query, a query context; and selecting a second desired access path for said query, said second desired access path for said query being based on said one or more runtime costs, said one or more context costs, and said query context.

2. The computer-implemented method of claim 1, wherein selecting a second desired access path for said query comprises:

determining, at bind time, a query dependency structure, said query dependency structure being based on said one or more runtime costs, said one or more context costs, and query contexts; and selecting, at execution time, a second desired access path for said query, said desired access path for said query being based on said query dependency structure and said query context.

3. The computer-implemented method of claim 1, wherein identifying a context for said query is based on an input data sequence for said query comprising an identified order.

4. The computer-implemented method of claim 1, wherein determining one or more context costs comprises determining whether said batch processing job comprises one or more candidate query contexts.

5. The computer-implemented method of claim 4, wherein determining whether said batch processing job comprises comparable access paths comprises:

counting one or more candidate query contexts; and responsive to said batch processing job comprising two or more candidate query contexts, determining that said batch processing job comprises comparable access paths;

responsive to said batch processing job comprising only one candidate query contexts, determining that said batch processing job does not comprise comparable access paths.

6. The computer-implemented method of claim 1, wherein determining whether said batch processing job comprises comparable access paths comprises:

counting said one or more access paths;

responsive to said batch processing job comprising only one access path, determining that said batch processing job does not comprise comparable access paths; and responsive to said batch processing job comprising two or more access paths determining that said batch processing job does comprise comparable access paths.

7. A computer program product comprising:

one or more computer readable storage media and program instructions stored on said one or more computer readable storage media, said program instructions comprising instructions to:

receive a batch processing job;

identify one or more access paths, for said batch processing job;

determine one or more runtime costs, each runtime cost being for each of said one or more access paths;

determine whether said batch processing job comprises comparable access paths wherein said instructions to determine whether said batch processing job comprises comparable access paths comprise instructions to:

receive a runtime comparison threshold, said runtime comparison threshold being a numerical difference in runtime between each runtime cost of said one or more runtime costs;

determine whether any said runtime cost comprises a comparable cost, said comparable cost being based on said runtime comparison threshold; and responsive to any said runtime cost comprising said comparable cost:

determine that said batch processing job does comprise comparable access paths; and responsive to no said runtime cost comprising said comparable cost:

determine that said batch processing job does not comprise comparable access paths; and responsive to said batch processing job not comprising comparable access paths:

receive a query;

select a first desired access path for said query, said first desired access path for said query being based on said one or more runtime costs; and responsive to said batch processing job comprising comparable access paths:

determine one or more context costs, each of said one or more context costs being a context cost for each of the one or more access paths;

receive a query;

identify, for said query, a query context; and select a second desired access path for said query, said second desired access path for said query being based on said one or more runtime costs, said one or more context costs, and said query context.

8. The computer program product of claim 7, wherein said instructions to select a second desired access path for said query comprise instructions to:

determine, at bind time, a query dependency structure, said query dependency structure being based on said one or more runtime costs, said one or more context costs, and query contexts; and select, at execution time, a second desired access path for said query, said desired access path for said query being based on said query dependency structure and said query context.

9. The computer program product of claim 7, wherein said instructions to identify a context for said query are based on an input data sequence for said query comprising an identified order.

10. The computer program product of claim 7, wherein said instructions to determine one or more context costs comprise instructions to determine whether said batch processing job comprises one or more candidate query contexts.

11. The computer program product of claim 10, wherein said instructions to determine whether said batch processing job comprise comparable access paths comprise instructions to:
- count one or more candidate query contexts;
- responsive to said batch processing job comprising two or more candidate query contexts, determine that said batch processing job comprises comparable access paths; and
- responsive to said batch processing job comprising only one candidate query contexts, determine that said batch processing job does not comprise comparable access paths.

12. The computer program product of claim 7, wherein said instructions to determine whether said batch processing job comprises comparable access paths comprise instructions to:
- count said one or more access paths;
- responsive to said batch processing job comprising only one access path, determine that said batch processing job does not comprise comparable access paths; and
- responsive to said batch processing job comprising two or more access paths, determine that said batch processing job does comprise comparable access paths.

13. A computer system comprising:
one or more computer processors;
one or more computer readable storage media;
computer program instructions; and
said computer program instructions being stored on said computer readable storage media for execution by at least one of said one or more processors, said computer program instructions comprising instructions to:
- receive a batch processing job;
- identify one or more access paths for said batch processing job;
- determine one or more runtime costs, each runtime cost being for each of said one or more access paths;
- determine whether said batch processing job comprises comparable access paths, wherein said instructions to determine whether said batch processing job comprises comparable access paths comprise instructions to:
  - receive a runtime comparison threshold, said runtime comparison threshold being a numerical difference in runtime between each runtime cost of said one or more runtime costs;
  - determine whether any said runtime cost comprises a comparable cost, said comparable cost being based on said runtime comparison threshold; and
  - responsive to any said runtime cost comprising said comparable cost:
    - determine that said batch processing job does comprise comparable access paths; and
  - responsive to no said runtime cost comprising said comparable cost:
    - determine that said batch processing job does not comprise comparable access paths; and
- responsive to said batch processing job not comprising comparable access paths:
  - receive a query;
  - select a first desired access path for said query, said first desired access path for said query being based on said one or more runtime costs; and
- responsive to said batch processing job comprising comparable access paths:
  - determine one or more context costs, each of said one or more context costs being a context cost for each of the one or more access paths;
  - receive a query;
  - identify, for said query, a query context; and
  - select a second desired access path for said query, said second desired access path for said query being based on said one or more runtime costs, said one or more context costs, and said query context.

14. The computer system of claim 13, wherein said instructions to select a second desired access path for said query comprise instructions to:
- determine, at bind time, a query dependency structure, said query dependency structure being based on said one or more runtime costs, said one or more context costs, and query contexts; and
- select, at execution time, a second desired access path for said query, said desired access path for said query being based on said query dependency structure and said query context.

15. The computer system of claim 13, wherein said instructions to identify a context for said query are based on an input data sequence for said query comprising an identified order.

16. The computer system of claim 13, wherein said instructions to determine one or more context costs comprise instructions to determine whether said batch processing job comprises one or more candidate query contexts.

17. The computer system of claim 13, wherein said instructions to determine whether said batch processing job comprises comparable access paths comprise instructions to:
- count said one or more access paths;
- responsive to said batch processing job comprising only one access path; determine that said batch processing job does not comprise comparable access paths; and
- responsive to said batch processing job comprising two or more access paths, determine that said batch processing job does comprise comparable access paths.

\* \* \* \* \*